United States Patent
Kachare et al.

(10) Patent No.: US 12,079,510 B2
(45) Date of Patent: Sep. 3, 2024

(54) SYSTEMS AND METHODS FOR EXECUTING DATA PROCESSING FUNCTIONS

(71) Applicant: Samsung Electronics Co., Ltd., Suwon-si (KR)

(72) Inventors: Ramdas P. Kachare, Pleasanton, CA (US); Amir Beygi, San Jose, CA (US); Mostafa Aghaee, San Jose, CA (US); Jingchi Yang, Sunnyvale, CA (US); Tinh Tri Lac, Manteca, CA (US); Sonny Pham, Ramon, CA (US); Nayankumar Patel, Fremont, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 94 days.

(21) Appl. No.: 17/960,033

(22) Filed: Oct. 4, 2022

(65) Prior Publication Data

US 2024/0086102 A1  Mar. 14, 2024

Related U.S. Application Data

(60) Provisional application No. 63/404,896, filed on Sep. 8, 2022.

(51) Int. Cl.
*G06F 3/06* (2006.01)
*G06F 13/38* (2006.01)

(52) U.S. Cl.
CPC ............ *G06F 3/0655* (2013.01); *G06F 3/061* (2013.01); *G06F 3/0683* (2013.01); *G06F 13/385* (2013.01)

(58) Field of Classification Search
None
See application file for complete search history.

(56) References Cited

U.S. PATENT DOCUMENTS

| | | |
|---|---|---|
| 7,103,008 B2 | 9/2006 | Greenblat et al. |
| 7,856,543 B2 | 12/2010 | Rhoades et al. |

(Continued)

FOREIGN PATENT DOCUMENTS

WO  WO 2015/019197 A3  2/2015

OTHER PUBLICATIONS

European Search Report for EP Application No. 23195593.1 dated Dec. 15, 2023, 9 pages.

(Continued)

*Primary Examiner* — Kevin Verbrugge
(74) *Attorney, Agent, or Firm* — Lewis Roca Rothgerber Christie LLP

(57) ABSTRACT

Systems and methods for executing a data processing function are disclosed. A first processing device of a storage accelerator loads a first instruction set associated with a first application of a host computing device. A second processing device of the storage accelerator loads a second instruction set associated with the first application. A command is received from the host computing device. The command may be associated with data associated with the first application. The first processing device identifies at least a first criterion or a second criterion associated with the data. The first processing device processes the data according to the first instruction set in response to identifying the first criterion. The first processing device writes the data to a buffer of the second processing device in response to identifying the second criterion. The second processing device processes the data in the buffer according to the second instruction set.

20 Claims, 8 Drawing Sheets

(56) References Cited

U.S. PATENT DOCUMENTS

| | | |
|---|---|---|
| 8,015,567 B2 | 9/2011 | Hass |
| 8,200,992 B2 | 6/2012 | Felch et al. |
| 10,261,903 B2 | 4/2019 | Sakthivel et al. |
| 10,353,706 B2 | 7/2019 | Kaul et al. |
| 10,409,614 B2 | 9/2019 | Ould-Ahmed-Vall et al. |
| 10,691,597 B1 | 6/2020 | Akkary et al. |
| 11,157,414 B2 | 10/2021 | Muthler et al. |
| 2021/0150663 A1 | 5/2021 | Maiyuran et al. |
| 2021/0157500 A1* | 5/2021 | Gu .................. G06F 3/0613 |
| 2021/0157593 A1* | 5/2021 | Gu .................. G06F 9/5027 |
| 2021/0157737 A1* | 5/2021 | Gu .................. G06F 9/3877 |
| 2021/0191868 A1 | 6/2021 | Ray et al. |
| 2021/0287423 A1 | 9/2021 | Guenther et al. |
| 2021/0295463 A1 | 9/2021 | Mandal et al. |
| 2021/0295583 A1 | 9/2021 | Vaidyanathan et al. |
| 2021/0397567 A1 | 12/2021 | Kang et al. |
| 2022/0051466 A1 | 2/2022 | Doyle et al. |
| 2022/0197704 A1 | 6/2022 | Gibb et al. |

OTHER PUBLICATIONS

Davidson, Scott, et al. "The Celerity Open-Source 511-Core RISC-V Tiered Accelerator Fabric: Fast Architectures and Design Methodologies for Fast Chips." *IEEE Micro* 38.2 (2018): pp. 30-41.

Ditzel, David R., "Accelerating ML Recommendation With Over 1,000 RISC-V/Tensor Processors on Esperanto's ET-SoC-1 Chip," vol. 42, IEEE Computer Society, May/Jun. 2022, pp. 31-38.

* cited by examiner

SYSTEMS AND METHODS FOR EXECUTING DATA PROCESSING FUNCTIONS

CROSS-REFERENCE TO RELATED APPLICATION(S)

The present application claims priority to and the benefit of U.S. Provisional Application No. 63/404,896, filed Sep. 8, 2022, entitled "PARALLEL/PIPELINED MULTI-CORE STORAGE ACCELERATOR," the entire content of which is incorporated herein by reference.

FIELD

One or more aspects of embodiments according to the present disclosure relate to computational storage devices, and more particularly to computational storage devices that execute data processing functions.

BACKGROUND

A processing device may be required to perform computations on large amounts of data in a quick manner. As such types of computations increase, there is an increase in data storage and processing needs.

The above information disclosed in this Background section is only for enhancement of understanding of the background of the present disclosure, and therefore, it may contain information that does not form prior art.

SUMMARY

One or more embodiments of the present disclosure are directed to a method for executing a data processing function. A first processing device of a storage accelerator loads a first instruction set associated with a first application of a host computing device. A second processing device of the storage accelerator loads a second instruction set associated with the first application. A command is received from the host computing device. The command may be associated with data associated with the first application. The first processing device identifies at least one of a first criterion or a second criterion associated with the data. The first processing device processes the data according to the first instruction set in response to identifying the first criterion. The first processing device writes the data to a buffer of the second processing device in response to identifying the second criterion. The second processing device processes the data in the buffer according to the second instruction set.

In some embodiments, the storage accelerator partitions the data into at least a first chunk and a second chunk; the first processing device processes the first chunk based on the first instruction set and generates a first output; the second processing device processes the second chunk based on the second instruction set and generates a second output; the storage accelerator generates a third output based on the first output and the second output; and the third output is provided to the host computing device.

In some embodiments, the first processing device includes a first processor and a first memory, and the second processing device includes a second processor and a second memory, wherein the first instruction set is loaded to the first memory and executed by the first processor, and the second instruction set is loaded to the second memory and executed by the second processor.

In some embodiments, the first instruction set is for performing a first data processing function for the first application, and the second instruction set is for performing a second data processing function for the first application that is different from the first data processing function.

In some embodiments, the first criterion includes an identifier for the first processing device, and the second criterion includes an identifier for the second processing device.

In some embodiments, the first processing device and the second processing device alternate control of the buffer for writing or reading the data into or out of the buffer.

In some embodiments, the first processing device and the second processing device form a first processing pipeline, and a third processing device connected to a fourth processing device form a second processing pipeline.

In some embodiments, the method further comprises: partitioning the data into a first chunk, a second chunk, and a third chunk; providing the first chunk and second chunk to the first processing pipeline; and providing the third chunk to the second processing pipeline.

In some embodiments, the method further comprises: receiving a result of the processing by the first processing device; identifying a third criterion associated with the result; and providing the result to the second processing pipeline in response to identifying the third criterion.

In some embodiments, the second processing device is assigned to a second application of the host computing device different from the first application.

One or more embodiments of the present disclosure are also directed to a storage device comprising: a first processing device including a first processor and a first memory, the first memory storing a first instruction set associated with a first application of a host computing device; a second processing device including a second processor, a second memory, and a buffer, the second memory storing a second instruction set associated with the first application; and a storage controller configured to receive a command from the host computing device, the command being associated with data associated with the first application, the storage controller configured to transmit the data to the first processing device. The first processing device is configured to: identify at least one of a first criterion or a second criterion associated with the data; process the data according to the first instruction set in response to identifying the first criterion; and write the data to the buffer of the second processing device in response to identifying the second criterion, wherein the second processing device is configured to process the data in the buffer according to the second instruction set.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1A:
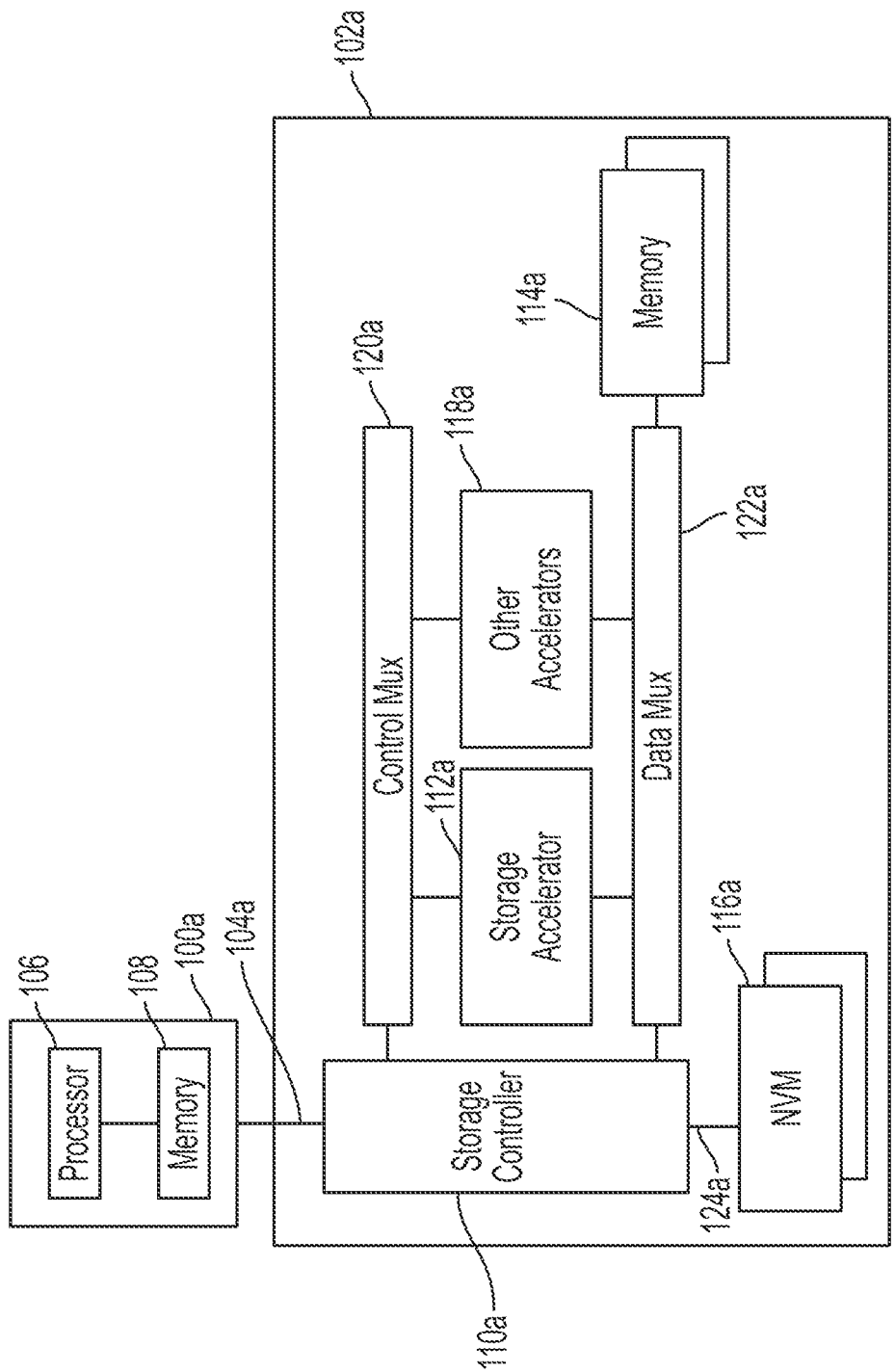
FIG. 1A depicts a block diagram of a computer system for executing data processing functions according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

It may be desirable to use a computational storage device for various data processing tasks, as the storage device may help provide efficient and cost-effective data processing solutions. The computational storage device may perform computations locally and send results of the computations to a host device It may be desirable to process data by a computational storage device as doing so may provide a lower response latency than performing the computation by a processor of a host computing device. The processing by the computational storage device may also minimize the use of compute resources, helping lower compute cycles, memory, bandwidth, and consumed energy.

The processing of the data may be performed by an embedded processor in the computational storage device. The embedded processor may include a hardware-based computation module for performing the data processing. The computation module may be designed using a register transfer level (RTL) or high-level synthesis (HLS) design methodologies. A hardware-based computation module, however, may be less flexible than a software-programmable module. For example, a software-programmable module may be easier to modify and debug than a hardware-based computation module. A hardware-based computation module may also require hardware development and verification resources that may not be needed for a software-programmable module.

In general terms embodiments of the present disclosure are directed to a storage accelerator in a computational storage device that may be programmed, via software, to execute a data processing function on behalf of an application running on a host computing device. The storage accelerator may include one or more processing cores or micro-code engines that may individually be programmed to perform an assigned data processing function. The processing cores may be referred to as storage processing units (SPUs).

In some embodiments, the storage accelerator is a multi-core storage accelerator that includes at least first and second SPUs for pipelined and/or concurrent processing of input data (e.g., data from an application). The data processing function programmed into the first SPU may be the same or different from the data processing function programmed into the second SPU.

In some embodiments, the input data to be processed by the SPUs is partitioned and/or packetized based on one or more programmable parameters. The generated data packets may be transmitted to one or more SPUs for processing. An SPU receiving a data packet may determine whether the data is to be processed or bypassed by the SPU. The data packet may be processed by the SPU according to the programmed function, in response to determining that the packet is addressed to the SPU. The SPU may bypass the packet, and transfer the packet to an adjoining SPU, in response to determining that the packet is addressed to another SPU.

In some embodiments, an SPU includes one or more buffers for efficient transfer of data and/or instructions (collectively referenced as data) from one SPU to another. The one or more buffers may be controlled using a ping-pong buffering mechanism. In this regard, a first SPU connected to a second SPU may switch control of the one or more buffers to take turns in writing and reading the data to and from the one or more buffers.

FIG. 1A depicts a block diagram of a computer system for executing data processing functions according to one or more embodiments. The system may include a host computing device ("host") 100a coupled to a computational storage device ("storage device") 102a over a wired or wireless host interface 104a including Ethernet, fiber channel, and/or other storage interface. The host 100a may transmit requests to the storage device 102a over the host interface 104a (e.g., using a connector and a protocol). The storage device 102a may provide results of the requests to the host 100a over the host interface 104a.

In some embodiments, the host interface 104a may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like.

In some embodiments, the host 100a includes a host processor 106 and a host memory 108. The host processor 106 may be a processing circuit, such as, for example, a general purpose processor or a central processing unit (CPU) core of the host 100a. The host memory 108 may include a substantially high performing main memory (e.g., primary memory) of the host 100a. For example, in some embodiments, the host memory 108 may include volatile memory, for example, such as dynamic random-access memory (DRAM). However, the present disclosure is not limited thereto, and the host memory 108 may include relatively high-performing non-volatile memory, such as, for example, NAND flash memory, Phase Change Memory (PCM), Resistive RAM, Spin-transfer Torque RAM (STTRAM), memory based on PCM technology, memory based on memristor technology, resistive random access memory (ReRAM), and/or the like.

In some embodiments, the storage device 102a may be considered a secondary memory that may persistently store data accessible by the host 100a. In this context, the storage device 102a may include (or may be) relatively slower memory when compared to the high performing memory of the host memory 108. For example, in some embodiments, the storage device 102a may be secondary memory of the host 100a, such as, for example, a Solid-State Drive (SSD). However, the present disclosure is not limited thereto, and in some embodiments, the storage device 102a may include any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 102a may conform to a large form factor standard (e.g., a 3.5 inch hard drive form-factor), a small form factor standard (e.g., a 2.5 inch hard drive form-factor), an M.2 form factor, an E1.S form factor, and/or the like. In some embodiments, the storage device 102a may conform to any suitable or desired derivative of these form factors. For convenience, the storage device 102a may be described hereinafter in the context of an SSD, but the present disclosure is not limited thereto.

The storage device 102a may include a storage controller 110a, storage accelerator 112a, storage memory 114a, and non-volatile memory (NVM) 116a. The storage memory 114a may be high-performing memory of the storage device 102a, and may include (or may be) volatile memory, such as, for example, DRAM, synchronous dynamic random access memory (SDRAM), double data rate (DDR) memory, etc. but the present disclosure is not limited thereto, and the storage memory 114a may be any suitable kind of high-performing volatile or non-volatile memory.

The NVM 116a may include a data storage medium for persistently storing data for the host device 102. The NVM 116a may include, for example, NAND flash memory. However, the present disclosure is not limited thereto, and the NVM 116a may include any suitable kind of memory for persistently storing the data according to an implementation of the storage device 102a (e.g., magnetic disks, tape, optical disks, and/or the like).

The storage controller 110a may be connected to the host 100a over the host interface 104a. The storage controller 110a may receive requests from the host 100a over the host interface 104a, and provide results of the requests via the host interface 104a. For example, the host 100a may provide data processing requests to the storage controller 110a, and the storage controller may respond with results of the data processing back to the host 100a, over the host interface 104a.

In some embodiments, the storage controller 110a includes at least one processing component embedded thereon for managing and processing communication with the host 100a and the NVM 116a. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing instructions (e.g., via firmware and/or software) for communicating and managing transactions with the host 100a and/or NVM 116a.

For example, the instructions executed by the storage controller 110a may be for fetching input/output (I/O) submission requests from one or more submission queues of the host memory 108, placing completion status data in one or more completion queues of the host memory, writing results data processing to the host memory, and/or the like. The instructions executed by the storage controller 124 may also be data access instructions for reading and/or writing data from and/or to the NVM 116a.

In some embodiments, the storage controller 110a transmits commands to read and/or write data from and/or to the NVM 116a over a storage interface 124a. In the context of the SSD, the storage interface 118 may be referred to as a flash translation layer (FTL).

In some embodiments, the storage device 102a includes a storage accelerator 112a configured to provide data processing functionality on behalf of one or more applications running on the host 100a. The storage accelerator 112a may be implemented on the same chip as the storage controller 110a, implemented on a chip separate from the storage controller 110a (e.g., a separate FPGA chip, system-on-chip (SoC), or ASIC), and/or the like.

In some embodiments, the storage device 102a includes one or more other storage accelerators 112a that provide additional acceleration functionality. The additional acceleration functionality may relate to the moving, processing, and/or storing of data in the NVM 116a.

In some embodiments, the storage controller 110a interfaces with the storage accelerator 112a and other accelerators 118a over a control multiplexor 120a and/or a data multiplexor 122a. The control multiplexor 120a may be used to select the accelerator 112a or 118a that is to exchange control messages with the storage controller 110a. The data multiplexor 122a may be used to select the accelerator 112a or 118a that is to exchange data with the storage memory 114a or storage controller 110a.

In some embodiments, the storage accelerator 112a retrieves data stored in the NVM 116a to perform a data processing function. In some embodiments, substantially large amounts of data may be retrieved from the NVM 116a for processing. Processing the data by the storage accelerator 112a near the location of the data may provide lower response latencies than performing the processing by the host processor 106, and may reduce energy consumption that may be needed to move substantially large data sets to and from the host processor 106.

Figure 1B:
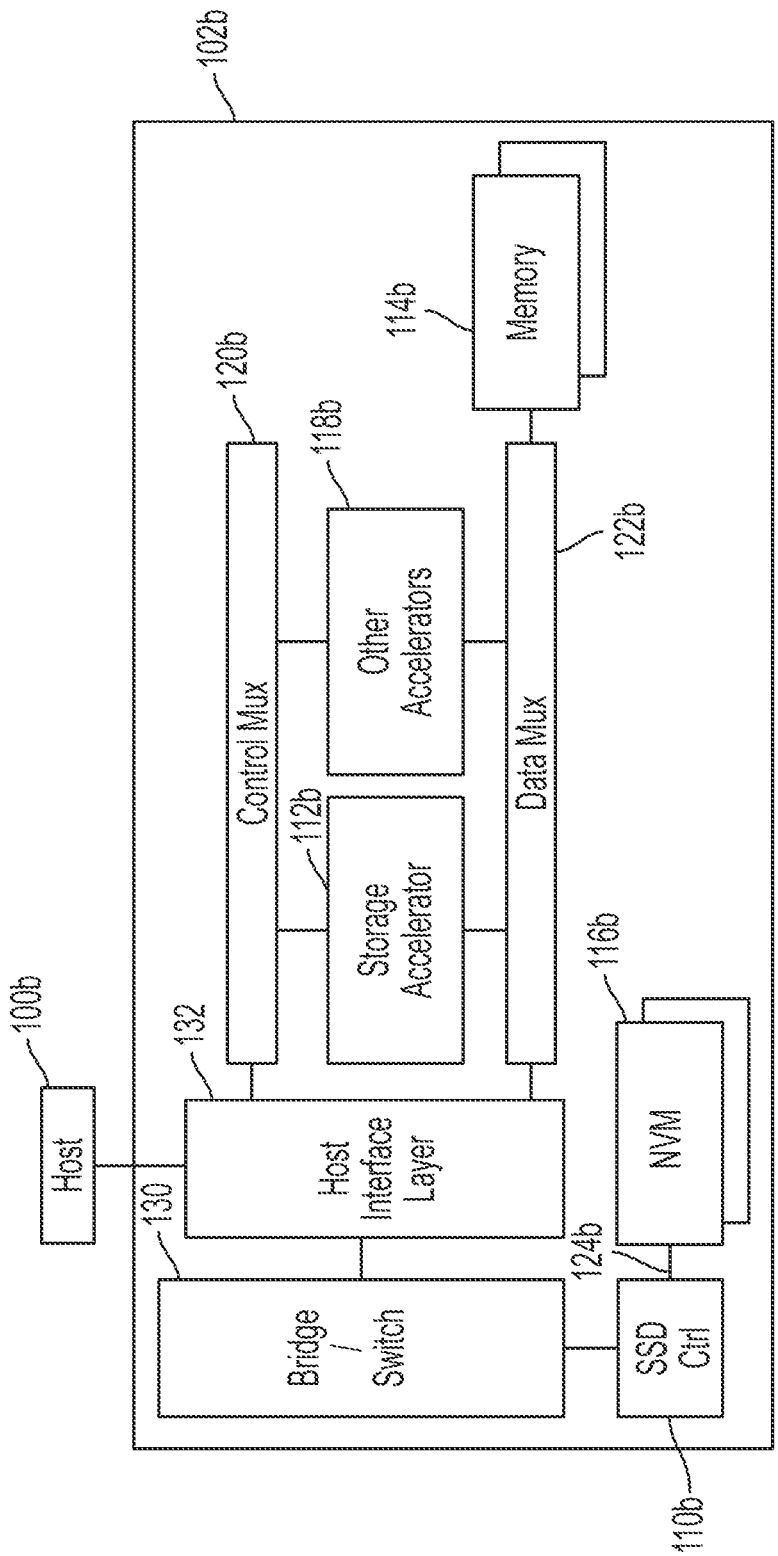
FIG. 1B depicts a block diagram of a computer system including a storage accelerator that is separate from a storage controller, for executing data processing functions according to one or more embodiments.

FIG. 1B depicts a block diagram of a computer system including a storage accelerator 112b that is separate (e.g., on a separate chip) from a storage controller 110b, that is configured to execute data processing functions according to one or more embodiments. The computer system may be similar to the computer system of FIG. 1A, except that in the embodiment of FIG. 1B, the system includes a bridge or switch 130 and a host interface layer 132. The bridge or switch 130 may select between the storage controller 110b and the host interface layer 132 for communicating with the host 100b.

The host interface layer 132 may include ports (e.g., PCIe ports) and/or endpoints that enable ingress communications from the host 100b to the storage accelerator 112b (or other accelerators 118b), and egress communications from the storage accelerator 112b (or other accelerators 118b), to the host 100b.

Figure 2:
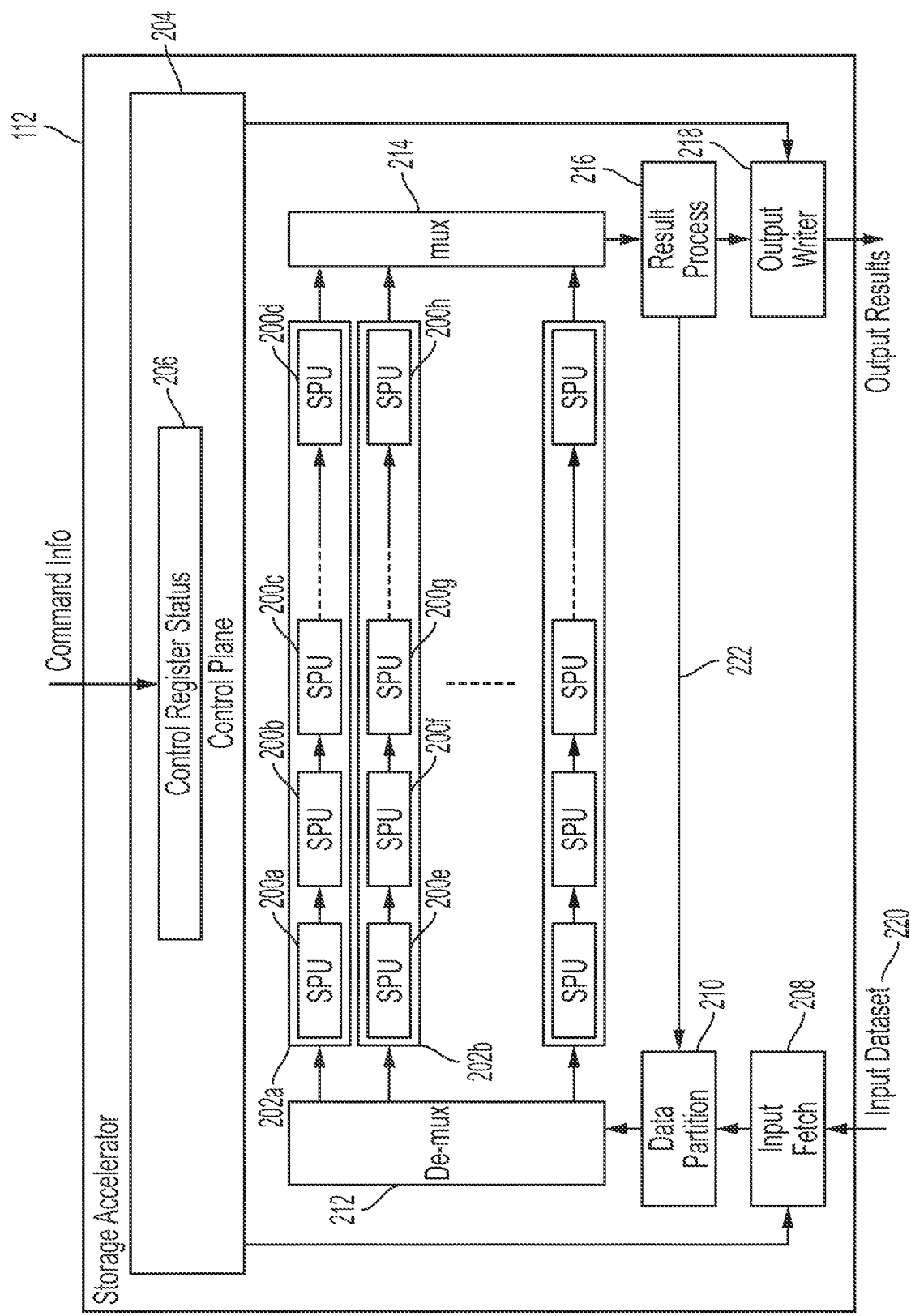
FIG. 2 depicts a block diagram of storage accelerator according to one or more embodiments.

FIG. 2 depicts a block diagram of the storage accelerator 112a, 112b (collectively referenced as 112) according to one or more embodiments. The storage accelerator may be configured as a multi-core storage accelerator that includes one or more storage processing units (SPUs) 200a-200h (collectively referenced as 200) arranged in one or more rows and columns. In some embodiments, the SPUs 200 in a row may be connected together to form a processing pipeline, also referred to as a storage processing queue (SPQ) line 202a-202c (collectively referenced as 202).

The one or more SPUs may be programmed, via software, to handle one or more data processing functions on behalf of one or more applications running on the host 100a, 100b (collectively referenced as 100). For example, the one or more applications may request a Sparse Length Sum (SLS) operation of a Deep Learning Recommendation Model (DLRM) using multiple vectors. The one or more applications may also request other data processing functions such as, for example, identifying records in a database table stored in the storage device, performing aggregation operations using the records, and transmitting results of the aggregation operations to the host 100.

The data processing functions may involve relatively large amounts of data (e.g., hundreds of gigabytes of data) stored in the NVM 116a, 116b (collectively referenced as 116). Processing the data by the one or more SPUs at the storage device 112 may be more efficient in terms of compute cycles, memory, network bandwidth, and energy consumed, than transmitting and processing the data by the host processor 106.

In some embodiments, a first SPU (e.g., SPU 200a) may be programmed with a first instruction set for performing a first data processing function for an application, and a second SPU (e.g., SPU 200b or SPU 200e) may be programmed with a second instruction set to perform a second data processing function for the application. The programming of the SPUs using software may provide flexibility when compared to hardware-based RTL or HLS designs. For example, instructions programmed into an SPU via software may be more easily modified, added, upgraded, and/or debugged than instructions hard-coded into the SPU using hardware.

The first and second data processing functions and associated first and second instruction sets programmed into the SPUs 200 may be different or the same. For example, SPU 200a and SPU 200e, or SPU 200a and SPU 200b, may be programmed with different instruction sets to perform different types of computations or transformations of data retrieved from the NVM 116. In this manner, SPU 200a and SPU 200e may work (e.g., concurrently) on different functions for the application.

In some embodiments, one or more SPUs in a first pipeline (e.g., SPQ line 202a) may be programmed with the same instruction set(s) as one or more SPUs in a second pipeline (e.g. SPQ line 202b). In this manner, the one or more SPUs in the first pipeline and the one or more SPUs in the second pipelines may perform (e.g., concurrently) a same data processing function for the application. Such parallelization of data processing function may provide higher data processing performance.

In some embodiments, the storage accelerator 112 includes a control plane 204 configured to receive information on commands (e.g., NVMe or direct PCIe based commands) from the host 100. For example, the storage controller 110a, 110b (collectively referenced as 110) may receive commands via the host interface 104 or bridge 130. The storage controller 110 may process the commands and extract information from the commands such as, for example, arguments for data processing (e.g., addresses, lengths, etc.), trigger signals, and/or the like, and store the extracted command information into a register 206. One or more components of the storage accelerator 112 may be programmed based on the extracted information. In some embodiments, the control plane 204 monitors the one or more components of the storage accelerator 112 and stores status, responses, and debugging information into the register 206 for providing to the host 100.

The storage accelerator 112 may further include, without limitation, an input fetch module 208, data partition module 210, demultiplexer 212, multiplexer 214, result process module 216, and output writer module 218. The input fetch module 208 may, in response to extracted command information in the register 206, obtain input data 220 from the storage memory 114a, 114b (collectively referenced as 114). The input data 220 retrieved from the storage memory 114 may be retrieved from the NVM 116 (e.g., by the storage controller 110), and/or provided by the host processor 106 via a direct memory access (DMA) transfer. The input data 220 may include, for example, parameters, data, and instruction sets generated by an application on the host. The memory address and length of the data to be obtained by the input fetch module 208 may be provided as part of the host command information and stored in the register 206.

The input data 220 obtained by the input fetch module 208 may be provided to the data partition module 210. In some embodiments, the data partition module 208 may be a higher speed or performance RTL module configured to preprocess the input data 220 for improving system performance. The preprocessing may include, for example, partitioning the data 210 into organized chunks that may be provided to the one or more SPQ lines 202 for processing. The data partitioning may be based on one or more criteria that may be programmed by an application. For example, the criteria may be a fixed chunk size, identified delimiters (e.g., commas, semicolons, braces, etc.), specific object boundaries such as parenthesis, curly braces etc, and/or the like. The preprocessing may also include filtering out extraneous data that may not be needed by the SPUs 200 for data processing.

In some embodiments, the partitioned data is encapsulated in a data packet. In this regard, the data partitioning module 210 may store the data in a payload section of the data packet, and generate a header for the packet. The header may identify, for example, the type of data stored in the packet, an identifier of the SPU 200 to which the packet is addressed, and/or the like. In some embodiments, the data partitioning module 210 also generates a final packet referred to as a flush packet for indicating an end of processing for the data 208. The flush packet is transmitted to the one or more SPQ lines 202 as a final packet.

In some embodiments, the demultiplexer 212 receives the generated data packets and provides the data packets to one or more appropriate SPQ lines 202. The demultiplexer 212 may determine the correct SPQ line 202 based on the SPU identifier included in the packet. In some embodiments, the SPQ line may be selected based on one of various algorithms including round robin (RR), first come first served (FCFS), weighted RR, deficit RR (DRR), weighted DRR, or the like.

In some embodiments, the packet is provided to the first SPU (e.g., SPU 200a) in the SPQ line 202 that includes the identified SPU (e.g., SPU 200g). In this regard, the demultiplexer 212 includes a buffer for storing the packet until an on-chip memory in the first SPU 200a becomes available to receive the packet. The first SPU 200a may evaluate the packet for determining whether the packet is addressed to the first SPU. The first SPU 200a may transfer the packet to a next SPU in the line (e.g., SPU 200b) in response to determining that the packet is not addressed to the first SPU 200a. This process may continue until the packet is received by the appropriate SPU.

In some embodiments, a same data path is followed for transferring data to the SPUs 200 regardless of whether the data chunks contain instruction sets, processing data, or arguments. Such a design may help reduce complexity of the storage accelerator, and allow the sharing of resources for the transfer of different types of data.

In some embodiments, the on-chip memory in an SPU is shared by an adjoining SPU for expediting the transfer of data packets. For example, SPUs 200a and 200b may access each other's on chip memory, and SPUs 200b and 200c may access each other's on-chip memory. In some embodiments, the sharing of the on-chip memory by adjoining SPUs is enabled by allocating first and second buffers on the on-chip memory. The first and second buffers may implement a ping-pong mechanism for data transfers. In this regard, a first SPU (e.g., SPU 200a) may assume control of the first buffer in an adjoining SPU (e.g., SPU 200b) to write a first packet into the first buffer. The first SPU 200a may set a flag in the shared on-chip memory to notify an adjoining SPU (e.g., SPU 200b) that the first packet is available for processing. The adjoining SPU 200b may take control of the first buffer to read and process the data packet. In some embodiments, the first SPU 200a may assume control of the second buffer in the adjoining SPU 200b to write a second packet into the second buffer. The first SPU 200a may assume the control of the second buffer concurrently with the second SPU 200b assuming control of the first buffer to read the first data packet. In this manner, the first SPU 200a need not wait for the second SPU 200b to finish retrieving the first packet before it can initiate transfer of the second packet.

The multiplexer 214 receives an output from the last SPU in the SPQ line 202, and forwards the output to the results process module 216. The results process module 216 may identify the type of output and take an appropriate processing action based on the identified type. The output may be a final data computation result, an intermediate packet, debug message, and/or the like. In the event of a final data computation result, the results process module 216 may provide the output to the output writer module 218. The final result may be provided to the output writer module 218 as the result is received from the multiplexer 214. In some embodiments, the results process module 216 waits to receive results for two or more (e.g., all) of the SPQ lines 202, and processes the results before outputting the processed result to the output writer module 218. For example, the results process module may process the results by sorting or aggregating the results. In some embodiments, the application running on the host 100 determines how the result process module 216 is to process the results.

In some embodiments, if the output from one of the SPQ lines 202 is an intermediate packet, the result process module 216 forwards the packet for additional processing by an SPU identified in the intermediate packet, via a loop data path 222. The forwarding of the packet may also be referred to as looping the packet. The looping of the packet may allow, for example, the chaining of a first SPQ line (e.g., SPQ line 202a) to a second SPQ line (e.g., SPQ line 202b), to create an extended line that allows additional data processing for a chunk of data.

The output write module 218 is configured to write the results of the data processing to the storage memory 114. One or more control information, such as, for example the base address to which to write the results, may be provided by the application and stored in the register 206 in the control plane 204. The output writer 218 may further the control plane 204 to send a completion message or interrupt to the host 100, to signal the host 100 to move the results from the memory 114 to the host memory 108.

In some embodiments, the storage accelerator 112 is shared by first and second applications running (e.g., concurrently) on the host 100. For example, the first application may be run on a first virtual machine, and the second application may be run on a second virtual machine. A first set of SPQ lines (e.g., SPQ line 202a) may be assigned to the first application or virtual machine, and a second set of SPQ lines (e.g., SPQ line 202b) different from the first may be assigned to the second application or virtual machine.

In some embodiments, one or more instances of the storage accelerator 112 may be generated and assigned to the different applications or virtual machines. A first set of SPQ lines may be associated with the first instance of the storage accelerator 112, and a second set of SPQ lines different from the first set may be associated with the second instance of the storage accelerator.

Figure 3:
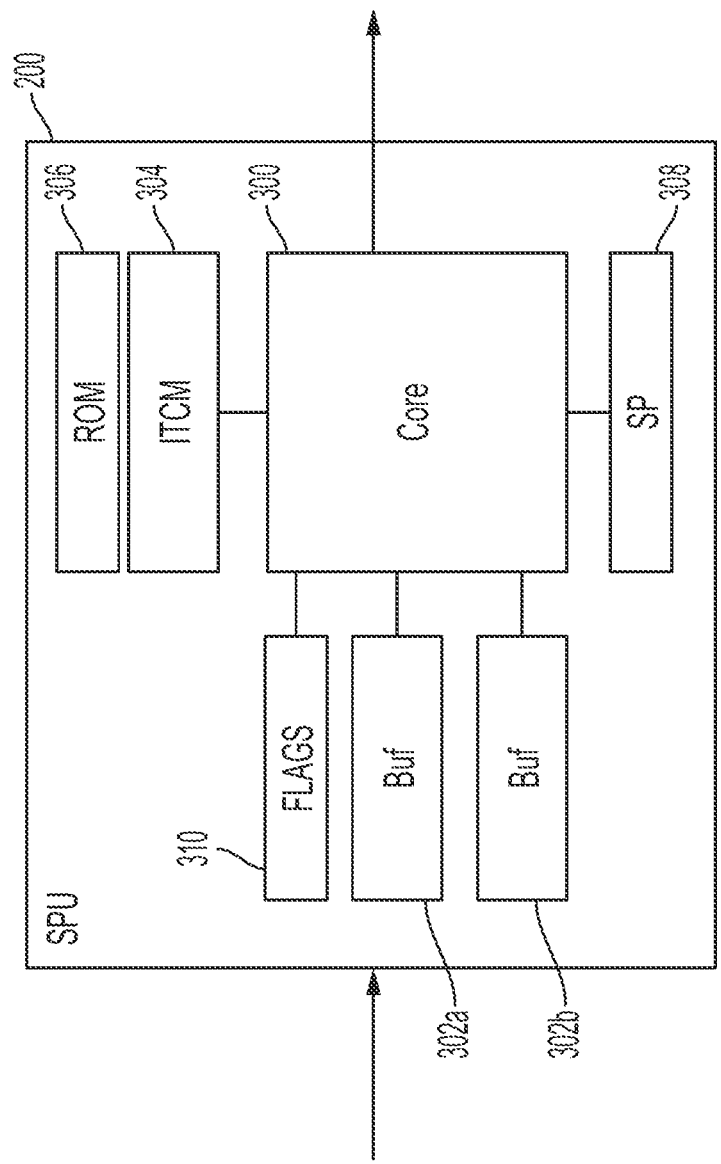
FIG. 3 depicts a schematic block diagram of a storage processing unit according to one or more embodiments.

FIG. 3 depicts a schematic block diagram of one of the SPUs 200 in an SPQ line 202 according to one or more embodiments. The SPU 200 may include, without limitation, a processing core 300, first and second buffers 302a, 302b (collectively referenced as 302), instruction memory 304, read only memory (ROM) 306, scratchpad memory 308, and a flag register 310. The processing core 300 may include a relatively lightweight core or micro-code engine such as, for example, a custom or proprietary instruction set architecture (ISA), a Very Large Instruction Word (VLIW) processor, a reduced instruction set computer (RISC), advanced RISC machine, FPGA-based embedded processor, or the like. In some embodiments, a first SPU (e.g., SPU 200a) includes a first type of core, and a second SPU (e.g., SPU 200b) includes a second type of core different from the first type. The core 300 may have additional specialized extensions and/or added coprocessors. Different extensions or coprocessors may be enabled for one SPU but disable for another SPU.

The ROM 306 may contain code or instructions (e.g., default code or instructions) for processing incoming packets according to information stored in the packets. The processing may entail storing all or portions of the data packet in the instruction memory 304 or scratchpad memory 308, running an instruction set stored in the instruction memory 304 based on the packet, forwarding the packet to an adjacent SPU 200, and/or the like.

The incoming data packets may be stored in one of the data buffers 302. The data buffers 302 may adhere to a ping-pong mechanism. The ping-pong mechanism may give control to a first SPU (e.g., SPU 200a) to access one of the data buffers (e.g., the first buffer 302a) shared with a second SPU (e.g., SPU 200b) as an output buffer, to write a data packet into the buffer 302a. The first SPU 200a may set a flag in the flag register 310 of the shared memory to notify the second SPU 200b that the data packet is ready for use. The flag may transfer control of the output buffer to the second SPU 200b.

The second SPU 200b may read the data stored in the first buffer 302a, as an input buffer, and take a processing action on the data. In some embodiments, the first SPU may take control of a second one of the data buffers (e.g., the second buffer 302b) shared with the second SPU 302b to write a second packet into the second buffer 302b. The writing of the second data packet into the second buffer 302b may be concurrent with the reading of the data from the first buffer 302a to take a processing action. The processing action may be, for example, to execute the instruction set in the instruction memory 304 based on the data. The processing action may also be to transfer the data to a buffer in a shared memory with a third adjacent SPU (e.g., SPU 200c). For example, the second SPU 200b may transfer the data to the third SPU 200c if the data is not addressed to the second SPU 200b.

In some embodiments, ROM firmware of the first SPU 200a handles the data transfer to the second SPU 200b. In some embodiments, DMA is implemented in hardware to perform the data transfers between adjacent SPUs. In some embodiments, the processing core 300 may include additional extended instructions to move data from an input buffer to an output buffer, in hardware.

In some embodiments, the instruction sets that are executed by the SPUs 200 for performing a data processing function are provided by the host 100 during an initialization phase. In this regard, the processing core 300 may execute the instructions in the ROM 306 to process incoming data packets and store the packets identified as instructions, to the instruction memory 304. The instruction memory 304 may include a tightly-coupled memory (TCM) or another type of low-latency memory.

During a runtime phase, the host 100 may generate processing data and/or arguments to be used by the instruction sets for data processing. The processing data may also be retrieved from the NVM 116. The header of the data packets containing the processing data and/or arguments may instruct the core 300 how to process the packet. For example, a packet containing arguments may cause the core 300 to store the arguments in the scratchpad memory 308. A packet containing processing data may cause the core 300 to invoke the instruction set in the instruction memory 304 to process the data according to the instruction set.

Figure 4:
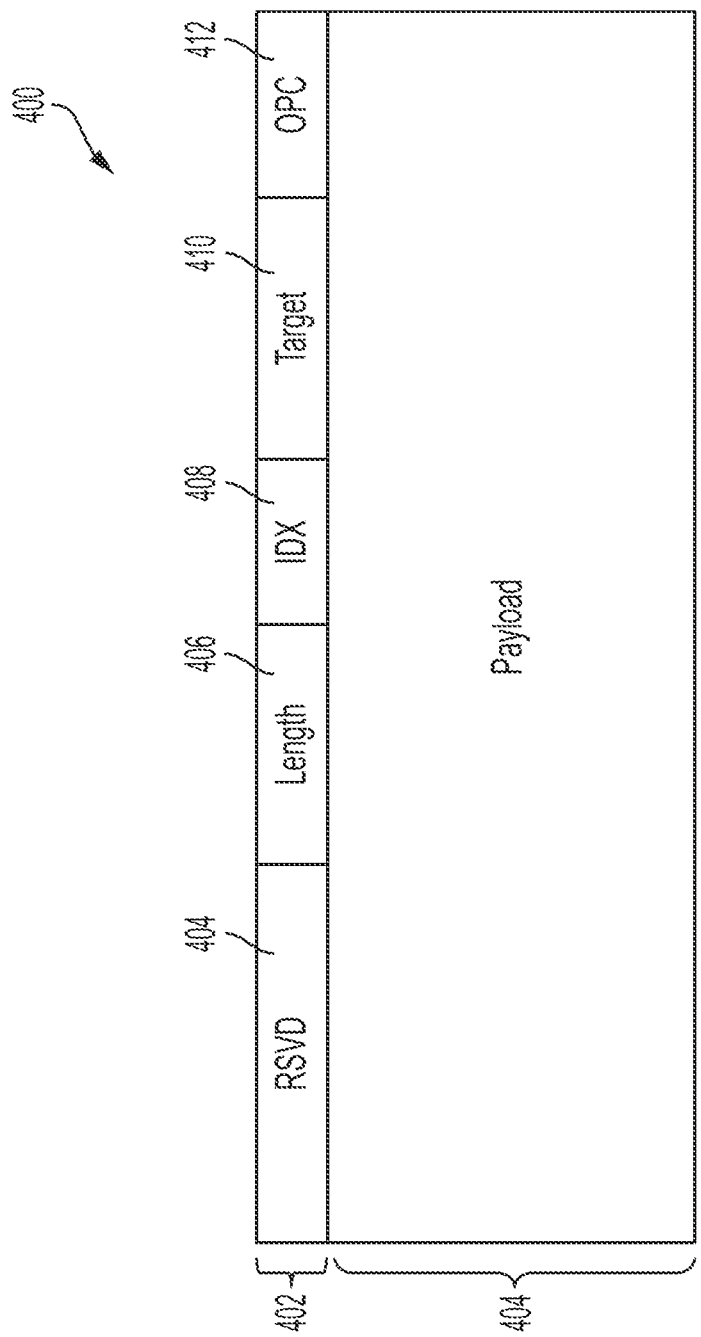
FIG. 4 depicts a layout diagram of a data packet provided to a storage processing unit according to one or more embodiments.

FIG. 4 depicts a layout diagram of a data packet 400 provided to an SPU 200 for processing according to one or more embodiments. For example, the data packet may be generated by the data partition module 210 to transmit a data chunk to one or more SPQ lines 202. The data packet 400 may include a header 402 and a payload 404. The header 402 may include one or more fields 404-412 for storing values for one or more parameters. In some embodiments, the values for the one or more parameters are set by the data partition module 210 or by one or more SPUs 200 in response to processing the packet.

Exemplary fields in the packet header 402 may include, without limitation, a reserved field 404, length field 406, data chunk identifier or index field 408, target field 410, and operation code (opcode) field 412. The opcode field 412 may store an operation to be performed with respect to the packet. An exemplary operation includes, for example, an "execute" operation. A packet with an "execute" opcode in the opcode field 412 may have, as the payload 404, data to be used during the execution of the instruction set in the instruction memory 304.

In some embodiments, the opcode field 412 may store a flag indicative of the type of payload 404 stored in the packet. Exemplary flags may indicate the payload as an instruction, as data, as a result, as an argument, as flush data, and/or the like. Appropriate actions may be taken in response to a detected flag. For example, an "instruction" opcode may indicate that the payload 404 includes an instruction code set, and the ROM code may cause the core 300 to store the instruction set in the instruction memory 304. A "data" opcode may indicate that the payload 404 includes data to be executed by the instruction set. A "results" opcode may indicate that the payload 404 contains results of data processing. The "results" opcode may be generated by the core 300 after executing the instruction set to indicate that the generated data packet contains data processing results. An "arguments" opcode may indicate that the payload 404 contains arguments to be used by the instruction code. A "flush" opcode may indicate that end of processing by the SPQ line 202. The "flush" packet may be generated by the data partition unit 210 as a last data packet to be provided to one or more of the SPQ lines 202.

In some embodiments, the target field 410 of the header 402 identifies a target SPU (e.g., SPU 200b) to which the packet 400 is destined. For example, the data partition module 210 may set the target field 410 with an identifier of the target SPU 200b to process a generated data packet. The target SPU 200b may be identified via a row and column number. In another example, a data chunk processed by a first (e.g., SPU 200a) may generate an intermediate packet for further processing by another SPU in the same SPQ pipeline (e.g. SPU 200c) or in different SPQ pipeline (e.g., SPU 200e) in the same SPQ pipeline. In this case, the first SPU 200a may identify the other SPU 200e in the target field 410 for further processing the intermediate packet. In some embodiments, the results process module 216 loops the intermediate packet to the other SPU 200e via the loop data path 222.

The address of an SPU listed in the target field 410 may identify more than one target SUP. The target field 410 may also indicate that any SPU 200 may receive and process the packet.

In some embodiments, the index or identifier field 408 stores an identifier of the data chunk stored in the packet. Having such an identifier may allow a result packet generated by an SPU 200 to be correlated to the data chunk for which the results were generated.

In some embodiments, the length field 406 identifies a length of the payload 404.

In some embodiments, the reserved field 404 is reserved for header data that may want to be included in the future.

Figure 5:
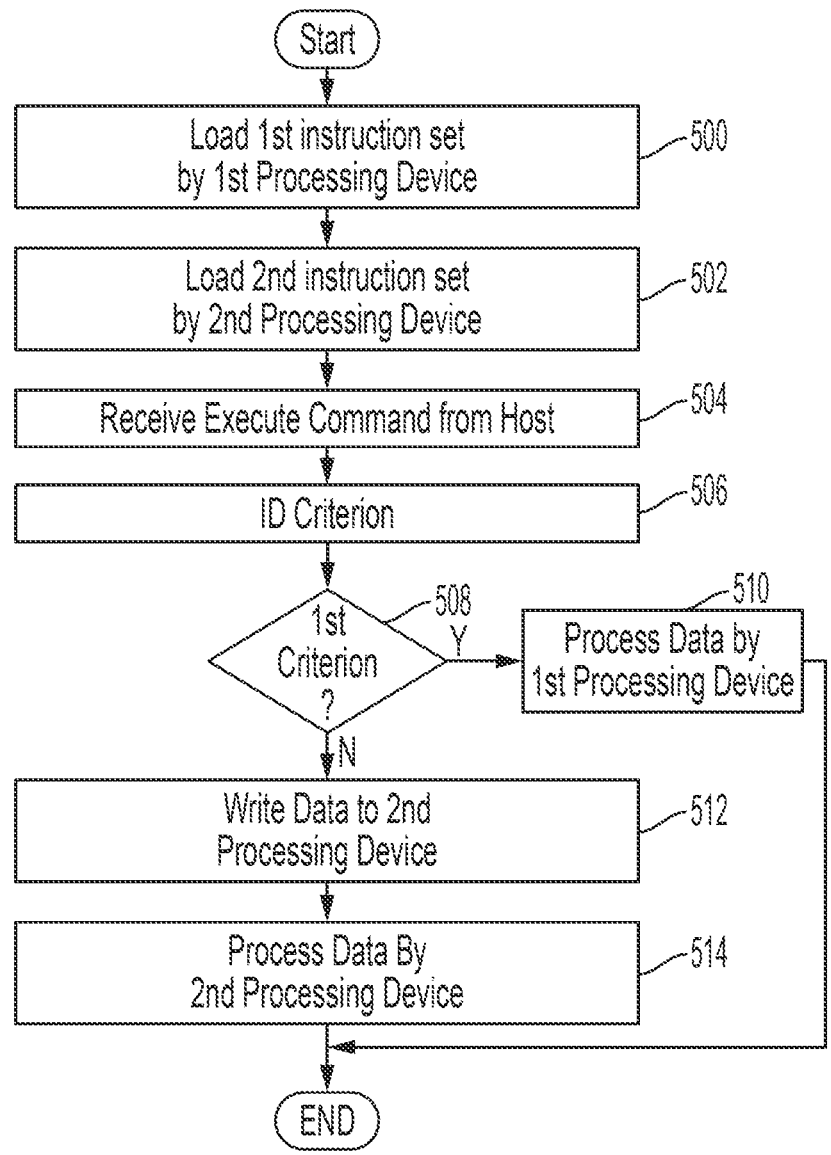
FIG. 5 depicts a flow diagram of a process for performing a data processing function via a storage accelerator according to one or more embodiments.

FIG. 5 depicts a flow diagram of a process for performing a data processing function via the storage accelerator 112 according to one or more embodiments. The process starts, and in an act 500, a first SPU 200a (first processing device) in the storage accelerator 112 loads a first instruction set associated with an application of the host 100. The first instruction set may be first binary code generated by the host 100. The first instruction set may be for performing a first data processing function for the application.

In act 502, a second SPU 200b (second processing device) loads a second instruction set associated with the application. The second instruction set may be second binary code generated by the host 100. The second instruction set may be independent from the first instruction set, and may be for performing a second data processing function for the application different from the first data processing function.

In act 504, the storage device 102 receives an execute command from the host 100. The execute command may be associated with data generated by the application and/or data retrieved from the NVM 116. The data may include, for example, arguments and other processing data used by a data processing function. The data may be provided to a first SPU (e.g., SPU 200a) as a data packet.

In act 506, the first SPU 200a examines the data packet and identifies a criterion (e.g., a first criterion or a second criterion) associated with the data packet. The criterion may be, for example, whether the data packet belongs to (e.g., should be processed by or is addressed to) the first SPU 200a. In this regard, the core 300 may execute the instructions stored in the ROM 306 to examine the header of the data packet to determine whether the header identifies the first SPU 200a.

In act 508, the first SPU 200a determines whether the first criterion has been identified. If the answer is YES, the first SPU 200a processes the data, in act 510, according to the first instruction set stored in the instruction memory 304. For example, the first criterion may be identification of the first SPU 200a in the header 402 of the packet.

Referring again to act 508, if the identified criterion is not the first criterion (e.g., the identified criterion is the second criterion), the first SPU 200a writes the data, in act 512, to a memory of a second SPU 200b (e.g., the second processing device). For example, the first SPU 200a may write the data into one of the buffers 302 in the second SPU 200b.

In act 512, the second SPU 200b reads the data from the memory (e.g., the one of the buffers 302), and processes the data according to the second instruction set.

Figure 6:
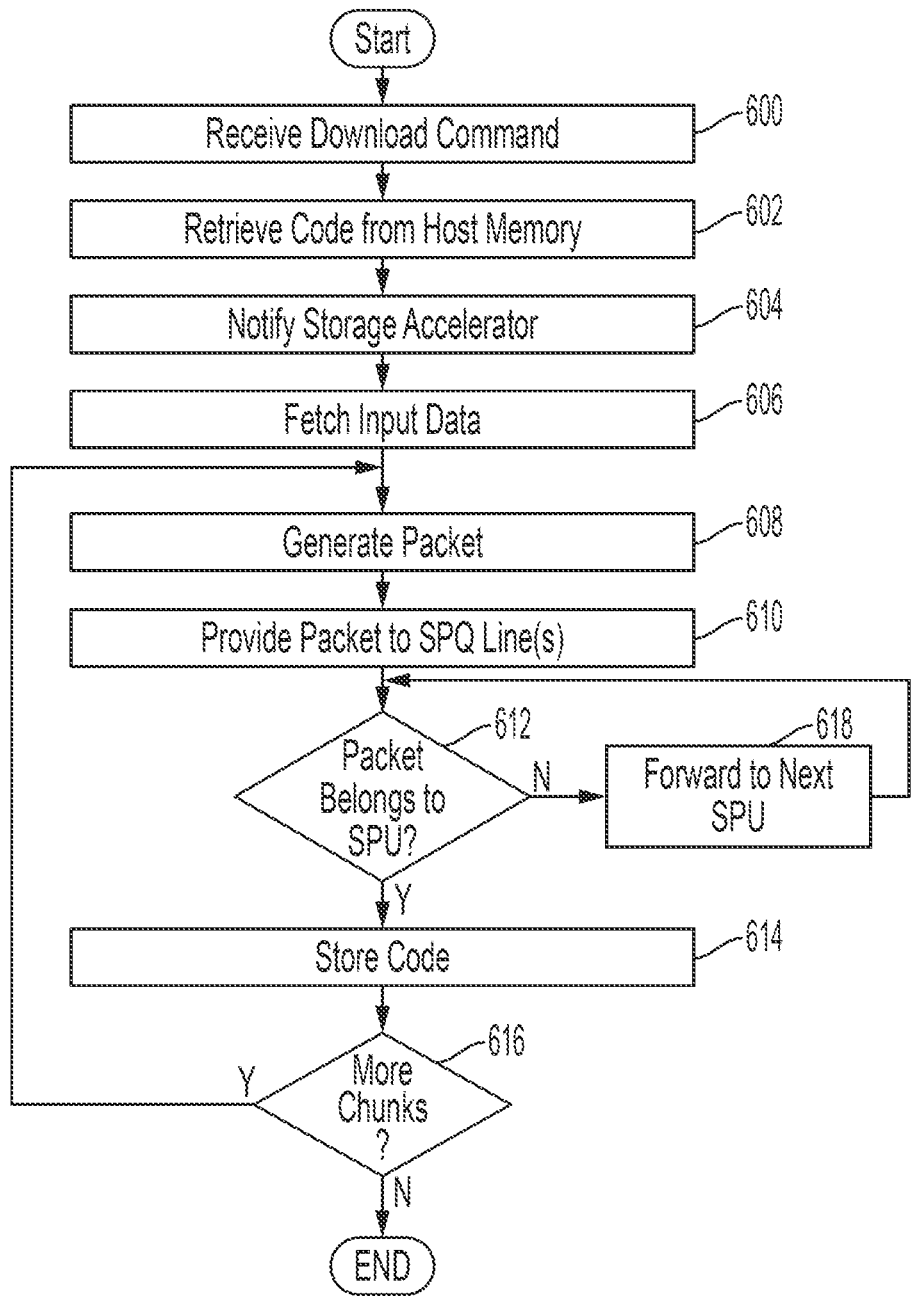
FIG. 6 depicts a flow diagram of a process for downloading an instruction set to a storage accelerator according to one or more embodiments.

FIG. 6 depicts a flow diagram of a process for downloading an instruction set to the storage accelerator 112 according to one or more embodiments. The host 100 may identify the application having one or more data processing functions that are to be offloaded to the storage device 102 for execution by the storage accelerator 112. The host processor 106 may compile the application and generate corresponding binary code (e.g., instruction set). The application may be written in a programming language such as C or C++ and cross-compiled to SPU instruction set architecture.

In some embodiments, the host processor 106 generates a packet that includes the binary code, and stores the packet in the host memory 108. In some embodiments, the host processor 106 decides, based on knowledge of the number of available SPQ lines 202 and number of SPUs 200 in each SPQ line 202, which SPUs 200 are to execute which portions of the binary code (also referred to a first instruction set and a second instruction set). Identification of the SPQ lines 202 and/or SPUs 200 may be included as header data for one or more packets generated by the host processor 106. In this manner, the host processor 106 may control the utilization of the SPUs by one or more applications.

In some embodiments, the host generates a command (e.g., an NVMe command) for initiating the download of the binary code. The command may include a pointer to the one or more the packets in the host memory 108 that stores the binary code.

The download process may start with the storage device 102 receiving the download command in act 600. The command may be received via the host interface 104a or bridge 130.

In act 602, the storage controller 110 retrieves the one or more packets storing the binary code from the host memory 108, and stores the one or more packets in the storage memory 114. In some embodiments, the storage controller 110 retrieves the one or more packets via a DMA transfer from the host memory 108 to the storage memory 114.

In act 604, the storage controller 110 notifies the storage accelerator 112 that data is available for processing. For example, the storage controller may store a trigger signal in the register 206 of the control plane 204 of the storage accelerator 112. Other command information such as, for example, memory addresses, lengths, and the like, m also be provided to the control plane 204 and stored in the register 206.

In act 606, the input fetch module 208 obtains the packet from the storage memory 114 as the input data 200, and provides the data to the data partition module 210. The data partition module 210 may partition the input data 200 into one or more data chunks. For example, a first chunk may contain a first instruction set (e.g., a first portion of the binary code) and a second chunk may contain a second instruction set (e.g., a second portion of the binary code).

In act 608, the data partition module generates a packet for one of the chunks. The packet may be similar to the packet 400 of FIG. 4. The data partition module 210 may set the header of the packet to identify the SPU 200 to which the packet is addressed, and to further identify the type of data stored in the packet. For example, the data partition module 210 may set the opcode field 412 as an instruction, and store the row and column number of the SPU 200 to which the packet is addressed, in the target field 410. The data partition module 210 may also identify the index of the data chunk in the index field 408, and the length of the payload in the length field 406. The binary code in the data chunk may be stored as the payload 404 of the packet.

In act 610, the demultiplexer 212 transmits the one or more packets provided by the data partition module 210, to one or more SPQ lines 202. The selection of the SPQ lines 510 may be based on the SPU information provided in the command packet from the host. For example, the packet may be provided to more than one SPQ lines 202 if more than one SPU is to be programmed with the binary code.

In some embodiments, the demultiplexer 212 transmits a received packet to the first SPU (e.g., SPU 200a) of the selected SPQ line 202.

In act 612, the core 300 may determine, based on the header of the packet, whether the packet belongs to the first SPU 200a. If the answer is YES, the core 300 may determine, based on the opcode in the packet, that the payload data is an instruction set, and write, in act 614, the instruction set into the instruction memory 304.

In act 616, a determination is made as to whether there are more data chunks to the processed and transferred to the SPUs 200. If the answer is YES, the process returns to act 608 to generate a packet for the data chunk.

Referring again to act 612, if the packet does not belong to the first SPU 200a, the core 300 transfers the packet, in act 616, to an adjacent SPU (e.g., SPU 200b), and the process returns to act 612 to determine whether the packet belongs to the adjacent SPU. The packet is passed from one SPU to another until the packet reaches the SPU to which the packet is addressed.

Figure 7:
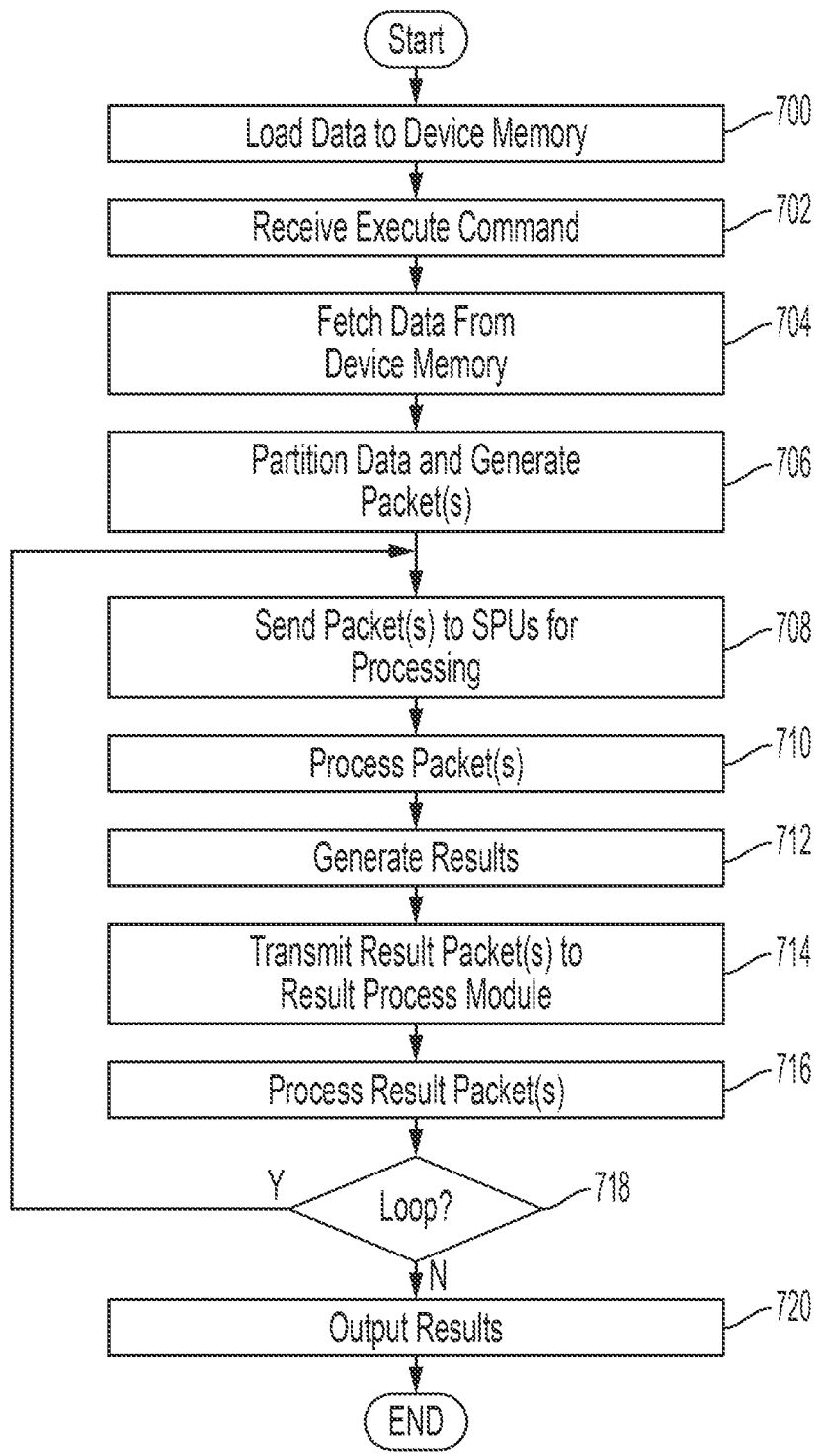
FIG. 7 depicts a flow diagram of a process for processing input data according to instructions sets downloaded to one or more storage processing units according to one or more embodiments.

FIG. 7 depicts a flow diagram of a process for processing input data according to instructions sets downloaded to one or more SPUs 200 according to one or more embodiments. The process starts, and in act 700, the storage controller 110 loads the input data to the storage memory 114. The input data may include arguments to be used by the instruction sets and/or actual data to be processed. The input data may be loaded to the storage memory 114 in response to a command (e.g., an NVMe command) from the host 100, to move the input data from the host memory 108 into an allocated portion of the storage memory 114.

In act 702, the storage controller 110 receives an execute command from the host 100. The execute command may include parameters such as, for example, a pointer to arguments in the storage memory 114, argument length, a pointer to the data to be processed in the storage memory, data length, and a pointer to location in the storage memory 114 where to store the processing results.

In act 704, the input fetch module 208 fetches the input data from the storage memory 114 and forwards to the data partition module 210. The data partition module 210 may process the input data by partitioning the data, in act 706, into data chunks, and generating data packets for the data chunks. The generated data packets may be similar to the data packet 400 of FIG. 4.

In act 708, the data partition module 210 forwards one or more of the data packets to the SPUs 200 of an SPQ line 202. The SPQ line 202 receiving the data packet may be determined based on header information in the data packet. The data packet may be transferred from one SPU to another until the core 300 in the appropriate SPU 200 receives the data packet and determines that the packet belongs to the SPU.

The core 300 in the SPU 200 to which the packet is destined may process the packet, in act 710, based on the ROM code. In this regard, the core 300 may examine the header information in the packet for determining how to process the packet. For example, if the opcode field 412 of the packet indicates that the packet is an "argument" packet, the core 300 may, based on instructions in the ROM 306, store the arguments in the scratchpad memory 308.

If the opcode field 412 of the packet indicates that the packet is an "execute" packet, the core 300 may call the instruction set in the instruction memory 304 to process the packet and perform the data processing function associated with the instruction set.

In act 712, the processing of the data may generate an intermediate or a final result which may be stored in the buffer 302 and/or scratch pad memory. The core 300 may return processing control to the ROM code in response to finishing execution of the instruction code, and return length and status of the results to the ROM code as return values.

In act 714, the core 300 retrieves the processing results from the buffer 302 and or scratch pad memory, and generates a packet based on the results for transmitting to the results processing module 216. In this regard, the core 300 may insert an appropriate header to the generated packet that may indicate whether the packet is an intermediate packet or a final result packet. The result packet may be passed from one SPU to another in the SPQ line 202, and transmitted to the results process module 216 in act 714.

In act 716, the result process module 216 processes the results to output to the output writer module. In some embodiments, the result process module 216 may output the results as the result packet is received. In some embodiments, the result process module 216 waits to collect all the output results before outputting the results. The output results may also be aggregated or sorted by the results process module 216 prior to output.

The result process module 216 may further process the results to determine, act 718, whether the results packet should be looped for further processing by one or more SPUs 200. The determination may be based on header data in the results packet that indicates whether the packet is an intermediate packet or a final result packet. If the answer is YES, the process returns to act 708 for further processing of the result packet by one or more SPU 200. In this regard, the SPQ line 202 that is to receive the result packet may be determined by the header information in the result packet. In some embodiments, the SPQ line 202 receiving the result packet is different from the SPQ line associated with the SPU 200 generating the result.

Referring again to act 718, if the answer is NO, and no looping is instructed in the result packet, the result is output to the output writer module 218 in act 720, for writing the results into a results memory location of the storage memory 114 allocated by the host 100. The results written to the results memory location may be moved to the host memory 108 in response to a move command from the host.

In regards to the processes depicted in flow diagrams of FIGS. 5-7, it should be understood that the sequence of steps of the processes is not fixed, but can be modified, changed in order, performed differently, performed sequentially, concurrently, or simultaneously, or altered into any desired sequence, as recognized by a person of skill in the art.

In some embodiments, the systems and methods for executing a data processing function discussed above, are implemented using a processor. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, a function may be performed by hardware configured, i.e., hard-wired, to perform that function, by more general-purpose hardware, such as a CPU, configured to execute instructions stored in a non-transitory storage medium (e.g. memory), or as otherwise described above. A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for executing a data processing function have been specifically described and illustrated herein, many modifications and variations will be apparent to those skilled in the art. Accordingly, it is to be understood that systems and methods for executing a data processing function constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A method for executing a data processing function, the method comprising: loading, by a first processing device of a storage accelerator, a first instruction set associated with a first application of a host computing device; loading, by a second processing device of the storage accelerator, a second instruction set associated with the first application; receiving a command from the host computing device, the command being associated with data associated with the first application; identifying, by the first processing device at least one of a first criterion or a second criterion associated with the data; processing, by the first processing device, the data according to the first instruction set in response to identifying the first criterion; writing the data, by the first processing device, to a buffer of the second processing device in response to identifying the second criterion; and processing, by the second processing device, the data in the buffer according to the second instruction set.

Statement 2. The method of Statement 1 further comprising: partitioning, by the storage accelerator, the data into at least a first chunk and a second chunk; processing the first chunk by the first processing device based on the first instruction set and generating a first output; processing the second chunk by the second processing device based on the second instruction set and generating a second output; generating, by the storage accelerator, a third output based on the first output and the second output; and providing the third output to the host computing device.

Statement 3. The method of Statements 1 or 2, wherein the first processing device includes a first processor and a first memory, and the second processing device includes a second processor and a second memory, wherein the first instruction set is loaded to the first memory and executed by the first processor, and the second instruction set is loaded to the second memory and executed by the second processor.

Statement 4. The method of one of Statements 1-3, wherein the first instruction set is for performing a first data processing function for the first application, and the second instruction set is for performing a second data processing function for the first application that is different from the first data processing function.

Statement 5. The method of one of Statements 1-4, wherein the first criterion includes an identifier for the first processing device, and the second criterion includes an identifier for the second processing device.

Statement 6. The method of one of Statements 1-5, wherein the first processing device and the second processing device alternate control of the buffer for writing or reading the data into or out of the buffer.

Statement 7. The method of one of Statements 1-6, wherein the first processing device and the second processing device form a first processing pipeline, and a third processing device connected to a fourth processing device form a second processing pipeline.

Statement 8. The method of one of Statements 1-7 further comprising: partitioning the data into a first chunk, a second chunk, and a third chunk; providing the first chunk and second chunk to the first processing pipeline; and providing the third chunk to the second processing pipeline.

Statement 9. The method of one of Statements 1-8 further comprising: receiving a result of the processing by the first processing device; identifying a third criterion associated with the result; and providing the result to the second processing pipeline in response to identifying the third criterion.

Statement 10. The method of one of Statements 1-9, wherein the second processing device is assigned to a second application of the host computing device different from the first application.

Statement 11. A storage device comprising: a first processing device including a first processor and a first memory, the first memory storing a first instruction set associated with a first application of a host computing device; a second processing device including a second processor, a second memory, and a buffer, the second memory storing a second instruction set associated with the first application; a storage controller configured to receive a command from the host computing device, the command being associated with data associated with the first application, the storage controller configured to transmit the data to the first processing device, wherein the first processing device is configured to: identify at least one of a first criterion or a second criterion associated with the data; process the data according to the first instruction set in response to identifying the first criterion; and write the data to the buffer of the second processing device in response to identifying the second criterion, wherein the second processing device is configured to process the data in the buffer according to the second instruction set.

Statement 12. The storage device of Statement 11 further comprising a third processing device configured to partition the data into at least a first chunk and a second chunk, wherein the first processing device is configured to process the first chunk based on the first instruction set and generate a first output, wherein the second processing device is configured to process the second chunk based on the second instruction set and generate a second output, wherein the third processing device is configured to generate a third output based on the first output and the second output, and wherein the storage controller is configured to provide the third output to the host computing device.

Statement 13. The storage device of Statements 11 or 12, wherein the first processing device includes a first processor and a first memory, and the second processing device includes a second processor and a second memory, wherein the first instruction set is loaded to the first memory and executed by the first processor, and the second instruction set is loaded to the second memory and executed by the second processor.

Statement 14. The storage device of one of Statements 11-13, wherein the first instruction set is for performing a first data processing function for the first application, and the second instruction set is for performing a second data processing function for the first application that is different from the first data processing function.

Statement 15. The storage device of one of Statements 11-14, wherein the first criterion includes an identifier for the first processing device, and the second criterion includes an identifier for the second processing device.

Statement 16. The storage device of one of Statements 11-15, wherein the first processing device and the second processing device are configured to alternate control of the buffer for writing or reading the data into or out of the buffer.

Statement 17. The storage device of one of Statements 11-16, wherein the first processing device and the second processing device form a first processing pipeline, and a third processing device connected to a fourth processing device form a second processing pipeline.

Statement 18. The storage device of one of Statements 11-17 further comprising a fifth processing device configured to: partition the data into a first chunk, a second chunk, and a third chunk; provide the first and second chunk to the first processing pipeline; and provide the third chunk to the second processing pipeline.

Statement 19. The storage device of one of Statements 11-18 further comprising a fifth processing device configured to: receive a result of the processing by the first processing device; identify a third criterion associated with the result; and provide the result to the second processing pipeline in response to identifying the third criterion.

Statement 20. The storage device of one of Statements 11-19, wherein the second processing device is assigned to a second application of the host computing device different from the first application.

What is claimed is:

1. A method for executing a data processing function, the method comprising:
    loading, by a first processing device of a storage accelerator, a first instruction set associated with a first application of a host computing device;
    loading, by a second processing device of the storage accelerator, a second instruction set associated with the first application;
    receiving a command from the host computing device, the command being associated with data associated with the first application;
    identifying, by the first processing device at least one of a first criterion or a second criterion associated with the data;
    processing, by the first processing device, the data according to the first instruction set in response to identifying the first criterion;
    writing the data, by the first processing device, to a buffer of the second processing device in response to identifying the second criterion; and
    processing, by the second processing device, the data in the buffer according to the second instruction set.

2. The method of claim 1 further comprising:
    partitioning, by the storage accelerator, the data into at least a first chunk and a second chunk;
    processing the first chunk by the first processing device based on the first instruction set and generating a first output;
    processing the second chunk by the second processing device based on the second instruction set and generating a second output;
    generating, by the storage accelerator, a third output based on the first output and the second output; and
    providing the third output to the host computing device.

3. The method of claim 1, wherein the first processing device includes a first processor and a first memory, and the second processing device includes a second processor and a second memory, wherein the first instruction set is loaded to the first memory and executed by the first processor, and the second instruction set is loaded to the second memory and executed by the second processor.

4. The method of claim 1, wherein the first instruction set is for performing a first data processing function for the first application, and the second instruction set is for performing a second data processing function for the first application that is different from the first data processing function.

5. The method of claim 1, wherein the first criterion includes an identifier for the first processing device, and the second criterion includes an identifier for the second processing device.

6. The method of claim 1, wherein the first processing device and the second processing device alternate control of the buffer for writing or reading the data into or out of the buffer.

7. The method of claim 1, wherein the first processing device and the second processing device form a first processing pipeline, and a third processing device connected to a fourth processing device form a second processing pipeline.

8. The method of claim 7 further comprising:
    partitioning the data into a first chunk, a second chunk, and a third chunk;
    providing the first chunk and second chunk to the first processing pipeline; and
    providing the third chunk to the second processing pipeline.

9. The method of claim 7 further comprising:
    receiving a result of the processing by the first processing device;
    identifying a third criterion associated with the result; and
    providing the result to the second processing pipeline in response to identifying the third criterion.

10. The method of claim 7, wherein the second processing device is assigned to a second application of the host computing device different from the first application.

11. A storage device comprising:
    a first processing device including a first processor and a first memory, the first memory storing a first instruction set associated with a first application of a host computing device;
    a second processing device including a second processor, a second memory, and a buffer, the second memory storing a second instruction set associated with the first application; and
    a storage controller configured to receive a command from the host computing device, the command being associated with data associated with the first application, the storage controller configured to transmit the data to the first processing device, wherein the first processing device is configured to:
        identify at least one of a first criterion or a second criterion associated with the data;
        process the data according to the first instruction set in response to identifying the first criterion; and
        write the data to the buffer of the second processing device in response to identifying the second criterion, wherein the second processing device is configured to process the data in the buffer according to the second instruction set.

12. The storage device of claim 11 further comprising:
    a third processing device configured to partition the data into at least a first chunk and a second chunk, wherein the first processing device is configured to process the first chunk based on the first instruction set and generate a first output, wherein the second processing device is configured to process the second chunk based on the second instruction set and generate a second output, wherein the third processing device is configured to generate a third output based on the first output and the second output, and wherein the storage controller is configured to provide the third output to the host computing device.

13. The storage device of claim 11, wherein the first processing device includes a first processor and a first memory, and the second processing device includes a second processor and a second memory, wherein the first instruction set is loaded to the first memory and executed by the first processor, and the second instruction set is loaded to the second memory and executed by the second processor.

14. The storage device of claim 11, wherein the first instruction set is for performing a first data processing function for the first application, and the second instruction set is for performing a second data processing function for the first application that is different from the first data processing function.

15. The storage device of claim 11, wherein the first criterion includes an identifier for the first processing device, and the second criterion includes an identifier for the second processing device.

16. The storage device of claim 11, wherein the first processing device and the second processing device are configured to alternate control of the buffer for writing or reading the data into or out of the buffer.

17. The storage device of claim 11, wherein the first processing device and the second processing device form a first processing pipeline, and a third processing device connected to a fourth processing device form a second processing pipeline.

18. The storage device of claim 17 further comprising a fifth processing device configured to:
   partition the data into a first chunk, a second chunk, and a third chunk;
   provide the first and second chunk to the first processing pipeline; and
   provide the third chunk to the second processing pipeline.

19. The storage device of claim 17 further comprising a fifth processing device configured to:
   receive a result of the processing by the first processing device;
   identify a third criterion associated with the result; and
   provide the result to the second processing pipeline in response to identifying the third criterion.

20. The storage device of claim 17, wherein the second processing device is assigned to a second application of the host computing device different from the first application.

* * * * *